United States Patent [19]

Zimmet et al.

[11] Patent Number: 5,109,519

[45] Date of Patent: Apr. 28, 1992

[54] LOCAL COMPUTER PARTICIPATING IN MAIL DELIVERY SYSTEM ABSTRACTS FROM DIRECTORY OF ALL ELIGIBLE MAIL RECIPIENTS ONLY SERVED BY LOCAL COMPUTER

[75] Inventors: Carol Zimmet, Nashua, N.H.; Mary F. Keefe, Jamaica Plain, Mass.; Richard J. Amico, Hollis, N.H.

[73] Assignee: Wang Laboratories, Inc., Lowell, Mass.

[21] Appl. No.: 329,744

[22] Filed: Mar. 28, 1989

[51] Int. Cl.$^5$ .............................................. G06F 7/06
[52] U.S. Cl. .................................. 395/800; 364/419; 364/976; 364/964; 364/963; 364/962; 364/962.1; 364/963.3; 364/940; 364/940.61; 364/940.71; 364/DIG. 2
[58] Field of Search ... 364/200 MS File, 900 MS File, 364/419

[56] References Cited

U.S. PATENT DOCUMENTS

| | | | |
|---|---|---|---|
| 4,358,824 | 11/1982 | Glickman et al. | 364/200 |
| 4,799,156 | 1/1989 | Shavit et al. | 364/408 |
| 4,800,488 | 1/1989 | Agrawal et al. | 364/200 |
| 4,831,518 | 5/1989 | Yu et al. | 364/200 |
| 4,835,674 | 5/1989 | Collins et al. | 364/200 |
| 4,845,658 | 7/1989 | Gifford | 364/900 |
| 4,914,586 | 4/1990 | Swinehart et al. | 364/200 |
| 4,932,026 | 6/1990 | Dev et al. | 370/94.1 |
| 4,935,869 | 6/1990 | Yamamoto | 364/200 |
| 4,949,254 | 8/1990 | Shorter | 364/200 |
| 4,965,763 | 10/1990 | Zamora | 364/900 |

*Primary Examiner*—Thomas C. Lee
*Assistant Examiner*—Mehmet Geckil
*Attorney, Agent, or Firm*—Michael H. Shanahan

[57] ABSTRACT

Apparatus for delivering and receiving mail using a computer system with a mail directory file thereon. Each mail directory file in the mail delivery system having a user entry for mail recipients. The apparatus having a directory extract and update capability so that user directory entries may be changed on different mail computer systems.

2 Claims, 3 Drawing Sheets

LOCAL COMPUTER PARTICIPATING IN MAIL DELIVERY SYSTEM ABSTRACTS FROM DIRECTORY OF ALL ELIGIBLE MAIL RECIPIENTS ONLY SERVED BY LOCAL COMPUTER

1. FIELD OF THE INVENTION

The present invention relates generally to computerized mail delivery systems, and more specifically to updating a directory of information consisting in part of the names of possible mail recipients and the system address where mail for that recipient may be sent.

2. BACKGROUND OF THE INVENTION

With the advent of widespread use of computer systems in the office enviroment, it has become efficient for office workers to communicate with each other through use of these computer systems. It is also not uncommon for these computerized systems to be connected to each other via communication links so that information may be shared between the computer systems. Many workers have access to personal computers or computer terminals in the office for tasks such as word processing and spread sheet generation, and thus use of these terminals as a means of sending or receiving mail through the organization is a logical extension of the computer's communication capabilities. Messages may be typed onto a display screen and sent electronically to recipients via the communication networks that already exist for the computer systems.

This process of sending mail electronically requires that the sender identify the recipient of the message in some manner so that the computer can route the message correctly to its proper destination. Conventional computer mail delivery systems require that each mail recepient have an associated user identification or "User ID" by which the mail system knows the recipient. The sender of mail then addresses the recipient by this User ID when mail is to be sent. These User IDs are restricted to a fixed character length, which are usually short so the user can remember the ID. This user identification or code must additionally be unique so that the system can differentiate users. Because of these limitations it is very difficult to create a meaningful and descriptive User ID for all mail users in a large network. Thus many users will have User IDs that are arbitrary, and non-obvious.

User IDs defined in the above manner create a further complication in that as the network of mail users grows it is very difficult for users to remember these arbitrary identifications, and thus they must keep some record of all the mail users in the network so mail can be properly addressed. Many mail systems rely on a hard copy directory very similiar to a conventional telephone book to keep track of all the users identification and address.

While a hard-copy directory of mail users allows for lookup of an individuals User ID it produces problems in maintaining the timelinesss of the information. If a new mail user is added to the system, the users mail User ID will not be generally known until a new edition of the hard copy directory is produced. Because of printing expenses, this may be a long time. Similarly, a user that changes departments or responsibilities may obtain a new mail identification that will not be known until the directory is updated. A hard copy directory does not allow for on demand updating of the directory.

It is a first object of the invention to provide for on demand updating of mail directory information so that the addressing of mail recipients is accurate and efficient.

Another object of the invention is the identification of remote mail recipients to which mail may be sent. This identification to include among other things the computer system address where the users mail should be sent.

A still further object of the invention is the merging of local mail directory information for remote users with either new information or newly modified information from a remote mail directory.

4. SUMMARY OF THE INVENTION

This invention provides apparatus for overcoming the addressing limitations of conventional computerized mail delivery systems. In practicing the invention at least two computer systems 102 are connected by some communications medium such that mail messages may be exchanged by the users of both systems. These computer systems may be mainframes, micrcomputers, or personal computers. The connecting communication medium may be twisted pair wiring, coaxial cable, fiber optic cable, or any other such media. Additionally these computer systems may be organized in a cascaded arrangement such that mail messages pass through intermediate systems in their routing to the destination computer system. The connections between these intermediate systems may rely upon different communication media to pass the information. Different communication protocols may also be employed to transfer the mail messages.

Each computer system participating in the mail network accesses a directory of users that mail may be sent to. This directory contains entries for each mail user serviced by the local system, and also entries for remote users o other mail delivery systems. For each user identified in the directory a separate entry exists.

A directory entry for each user contains among other things the users's name, optionally the user's job title or job description, the computer system where mail for that user will be properly received, and an internally generated code uniquely identifying the user. This code is used by the mail system to differentiate users, but is never displayed to the sender of mail when choosing a mail recipient. This internal code is used most effectively to differentiate users who have the same name. Thus a mail item to be sent to "Joe Smith" can be sent through use of this internal code without confusion as to another Joe Smith in the organization.

Each mail user must be intially defined to the mail system on his local system so that the internally generated code will be unique in the network. If another mail system in the network is to include a user from a remote system in its directory that users local directory entry must be copied into the directory, thus preserving unique user identification.

The timely updating of directory information allows new users to participate in the mail network, be addressed by other mail users, and prevents misdelivery of mail items when a user's mailing address has changed. Recognizing these advantages, the present invention incorporates the capability to extract the directory entries of local users on a system and to prepare a file which may be sent over the network for updating remote directories. This extracted file contains local directory information pertaining to specific mail users and includes the user's name, job title or job description, and the internally generated identification code.

Using the internally generated identification code as a key remote directories are updated with the current status of the directory entries on the extracted directory file.

5. BRIEF DESCRIPTION OF THE DRAWINGS

Other objects, advantages, and features of the present invention will be understood by those of ordinary skill in the art after referring to the complete written description of the preferred embodiment in conjunction with the drawings, wherein:

FIG 1. is a schematic diagram of an embodiment of the present invention with multiple mail systems organized in a cascaded arrangement.

FIG 2. depicts a mail directory residing on a computer disk with its associated mail user entries.

6. DETAILED DESCRIPTION

Figure 1:
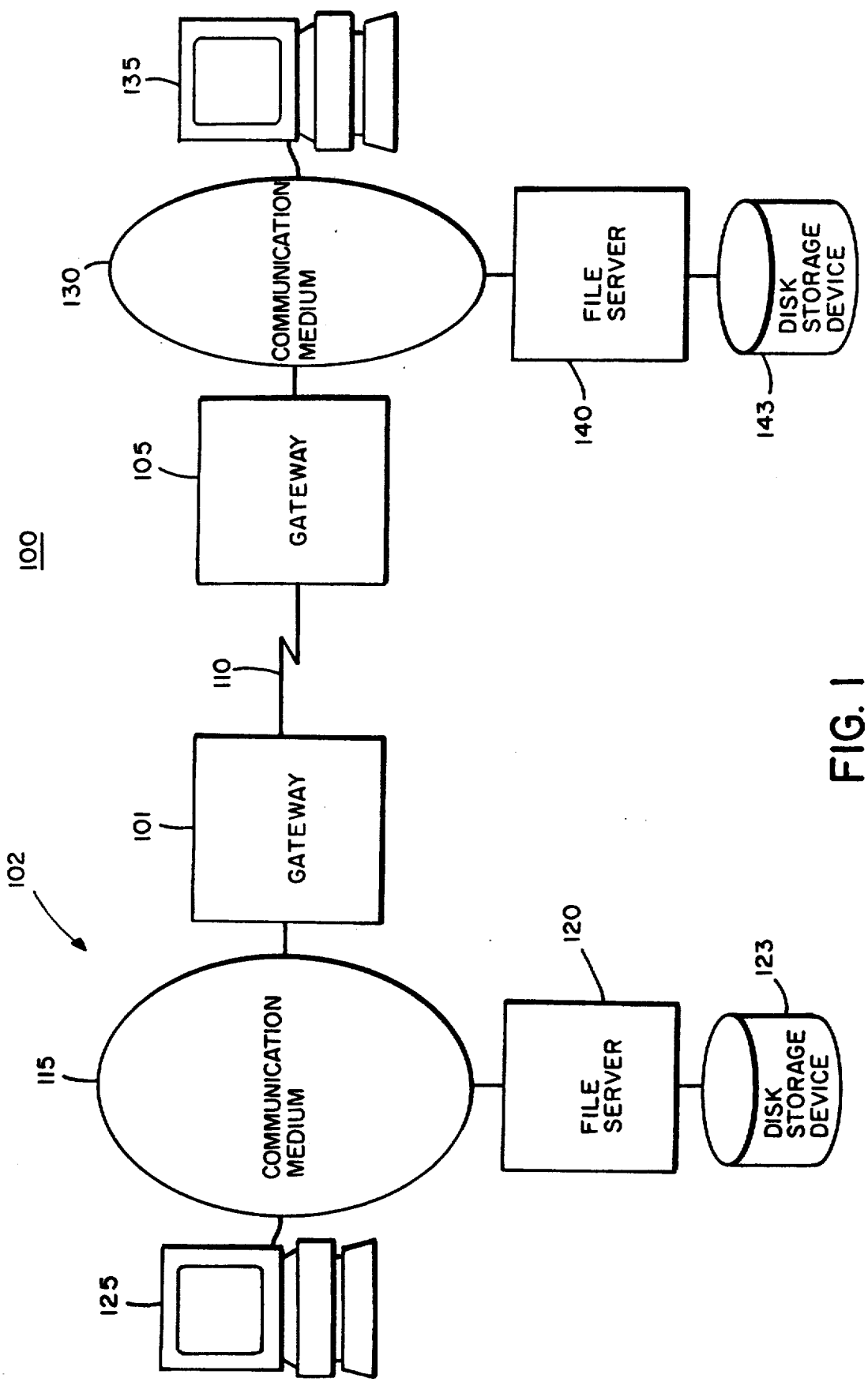

Referring now to FIG. 1, the following description presents the structure and operation of a mail delivery system 100 incorporating the present invention.

Mail Delivery Gateway 101 is connected to another Mail Delivery Gateway 105 via a communication medium 110. Each Mail Delivery Gateway is assigned a unique system name, that is used for routing mail and messages within the mail delivery system 100. This communication medium allows the transfer of mail and messages from Mail Delivery Gateway 101 to Mail Delivery Gateway 105. While the communication medium is depicted as a twisted pair link, those skilled in the art will recognize that any communication medium allowing the reliable transfer of information is equivalent. Mail Delivery Gateway 101 is further connected via a second communication medium 115 to a File Server System 120, FSS, coupled to a disk drive 123 for storing messages and mail. Additionallly Mail Delivery System 101 is coupled to a Mail Input Device 125, MID, comprising a display for viewing mail and a keyboard for entering mail messages. Again while the second communication medium 115 is depicted as a local area network, LAN, those skilled in the art will recognize that other forms of connection are equivalent. Mail Delivery System 105 is similarly connected by a third communication medium 130 to a MID 135 and and FSS 140.

As a result of the communication coupling depicted, a message origiating at MID 125 may be transferred to MID 135 via the two Mail Delivery Gateway systems 101 and 105, and the communication media 115, 110, and 130.

A mail user at MID 125 desiring to send mail to a user at MID 135 creates the mail on MID 125 and sends the mail item to FSS 120 to be stored on disk drive 123. Included within the mail item to be sent is an address header describing the recipient of the mail and the Mail Delivery Gateway at which the recipient resides.

Mail Delivery Gateway 101 periodically polls FSS 120 for any mail items to be serviced and finding one destined for Mail Delivery Gateway 105, sends the item to the gateway system. Mail Delivery Gateway 105, upon receiving the mailed item from Mail Delivery Gateway 101, investigates the address header to determine what MID is the recipient of the mailed item. Finding a mail item for MID 135, the Mail Delivery Gateway 105 sends the mail item to FSS 140 which stores the mail item on disk 143. Mail Delivery Gateway 105 subsequently notifies MID 135 of the received mail item. MID 135 interrogates the FSS 140 for the received mail item and the mail user views the mail item on the display for MID 135.

Figure 2:
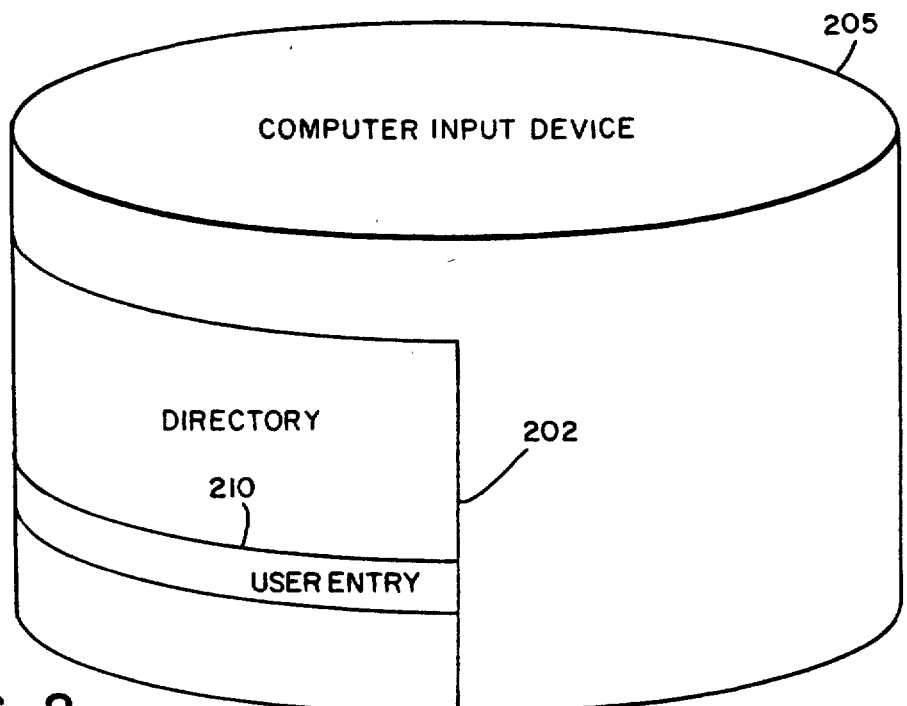

Referring now to FIG. 2, the structure of the mail directory will be described. The mail directory 202 is a file residing on a computer input device 205 that is readable by MID 125. The mail directory 202 describes the parameters for addressing the possible mail recipients in Mail Delivery System 100. A mail user who sends and receives mail messages at MID 125, and desiring to send a message to another mail user, views the mail directory 202 at MID 125 and chooses the appropriate addressee. In a embodiment of the present invention, the directory resides on a direct access storage device, commonly referred to as a disk. Yet those skilled in the art will recognize that any computer readable input device is equivalent to the disclosed disk device. The mail directory 202 is organized into user entries 210. Each user entry 210 describes the parameters for addressing a user on the Mail Delivery System 100.

Figure 3:
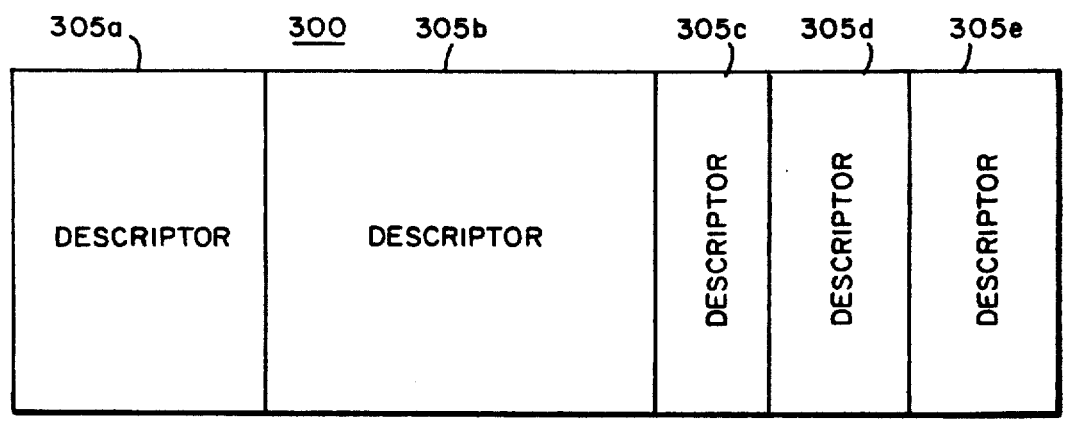
FIG. 3 depicts the structure of the user entry within the mail directory.

Referring now to FIG. 3, the structure of the user entry 210 will now be described. Each user entry 210 consists of a computer record 300 in which variable length user descriptors 305a through 305e are defined. It should be pointed out that the numbers 305a through 305e are not intended to suggest that only five fields comprise user entry 210 but that a plurality of such user descriptors exist. The information contained in computer record 300 consists of at least the mail users first and last name 305a, whether the user is a user serviced by the local Mail Delivery Gateway or a remote gateway 305b, the users job title or description 305c, and an internally generated identification code, that is used to uniquely differentiate mail users.

Figure 4:
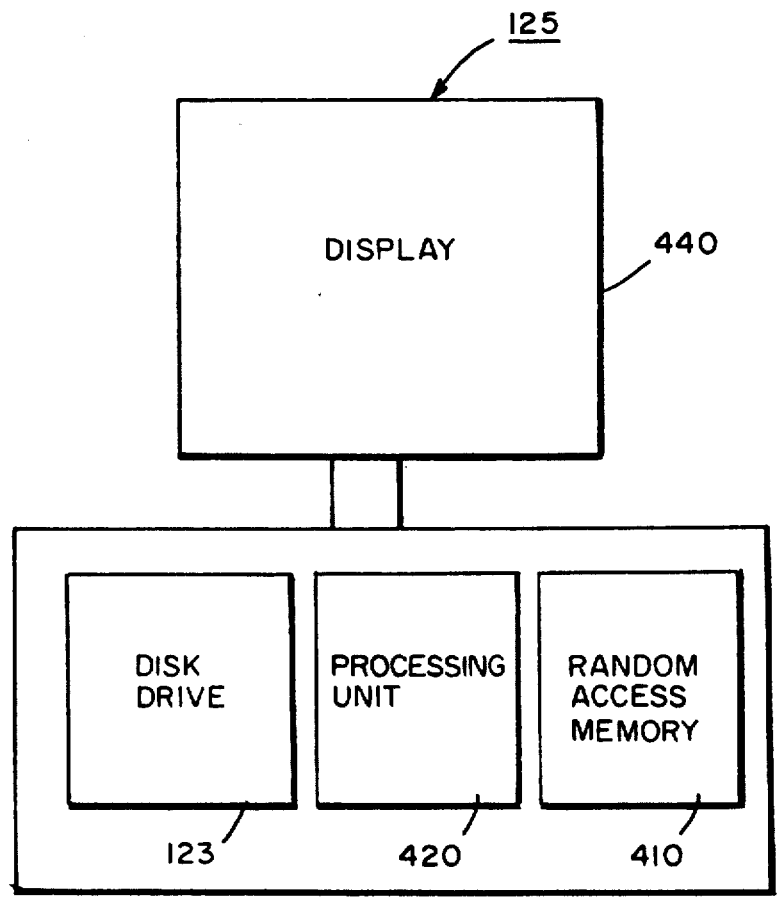
FIG. 4 is a schematic diagram of the primary components of a Mail Input Device.

The process of extracting local mail user records will now be described. This process is preliminary to packaging the records in a file, and transmitting the file to another Mail Delivery Gateway for update of that gateway's directory. Referring to FIG. 4, MID 125 is shown in more detail. MID 125 comprises a random access memory 410, for storing computer instructions and data, a central processing unit 420, for executing instructions, a disk drive 123 for permanently storing data and programs to be operated on by MID 125, and access to disk drive 123, and a video display 440 for viewing data. Mail directory 202 resides on disk drive 123. The interrelationships of these componeents of MID 125 will not be further described since they are conventional.

Figure 5:
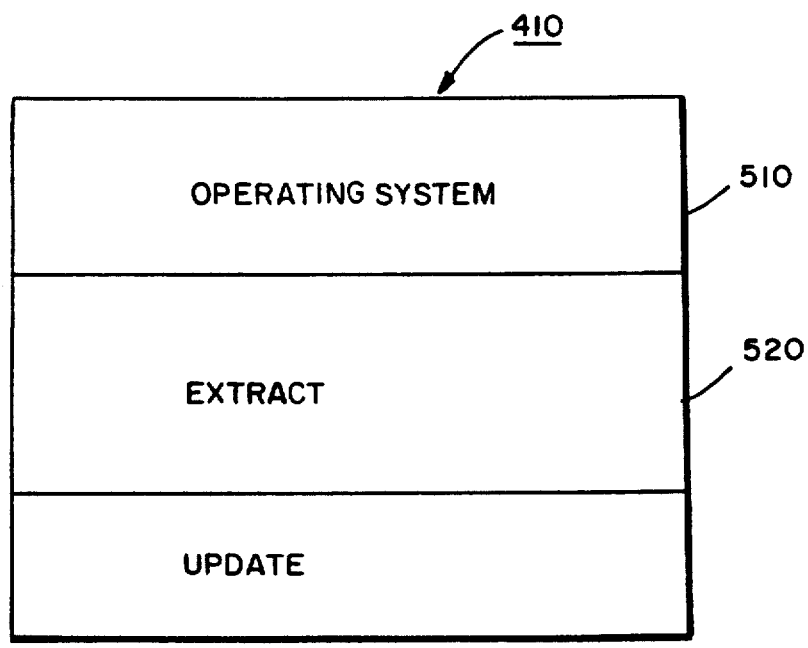
FIG. 5 is a diagram of the relationship of the Extract and Update tasks with the operating system of the Mail Input Device.

Referring to FIG. 5, MID 125 is controlled by instructions commonly referred to as an operating system 510. These instructions provide the read and write access to disk drive 123, whereon the mail directory 202 resides. Executing under the control of the operating system 510 is Extract 520, a process for selecting particular directory entries 210. Extract 520 selects from the mail directory 202 either all local user entries 210 or individual local user entries depending on the input parameters to Extract 520. The user entry 210 including the internally generated code is written to a data file, which is given the name of the Mail Delivery Gateway system appended with the suffix ".dir". This file is then transmitted to the requesting remote system for directory update at that system. The tranmission process will not be described since it is conventional.

The Extract file having been received at the remote MID 135 is written to its corresponding disk drive 123. MID 135 is similarly configured to MID 125, and thus is controlled by an operating system 510. The process of updating the mail directory 202 accomplished by a process Update 530 which is the reverse process of Extract 520. Like Extract 520, Update 530 is controlled by operating system 510, and provides for replacement of user entries 210 in the mail directory 202. All user entries 210 on the extract file may be input to the mail directory 202 or individual user entries 210 may be selected. Update 530 either replaces or adds user entries depending on whether the user entry 210 already exists in the mail directory 202. The user entry 210 is a keyed entry with the user's name as one of the keys. The address where a particular mail user resides is changed to the name of the file from which the user entries are taken. Additionally, the code determining whether the mail user is local or remote to this gateway is set to remote.

While the invention has been particularly shown and described with reference to the preferred embodiment thereof, it will be understood by those skilled in the art that various changes in form and details may be made therein without departing from the spirit and scope of the invention.

What I claim is:

1. A local computer system for participating in a mail delivery system providing mail delivery service to a plurality of eligible mail recipients, each of whom has a name, said local computer system serving some but not all eligible mail recipients of said mail delivery system, said local computer system comprising a gateway for interfacing said local computer system with an information transfer network suitable for communicating mail messages and mail directory data between eligible mail recipients of the mail delivery system served by said local computer system and eligible mail recipients of the mail delivery system not served by said local computer system, a processor, information storage means storing an operating program for said local computer system, program modules, mail messages, and a directory of all eligible mail recipients of the mail delivery system, entering means for entering mail messages, and displaying means for displaying mail messages, said gateway, said processor, said information storage means, said entering means, and said displaying means being interconnected for transfer of information thereamong, said directory having a data structure with an entry for each current eligible mail recipient served by said mail delivery system, said entry including a field giving the name of the mail recipient, a field indicating an identifying code unique to the named recipient, and a field indicating whether the named recipient is served by said local computer system, said operating program evoking an extract program module stored in said information storage means which abstracts from said directory and writes to an update data file only entries of said directory corresponding to eligible mail recipients served by said local computer system.

2. A computer system as claimed in claim 1, said information storage means storing an update program module which when evoked by said operating system program revises said directory so that all entries of a designated update file become entries of the directory and all prior entries in the directory with a user identifying code corresponding to that of an entry of the update file are deleted.

* * * * *